Patented Mar. 27, 1928.

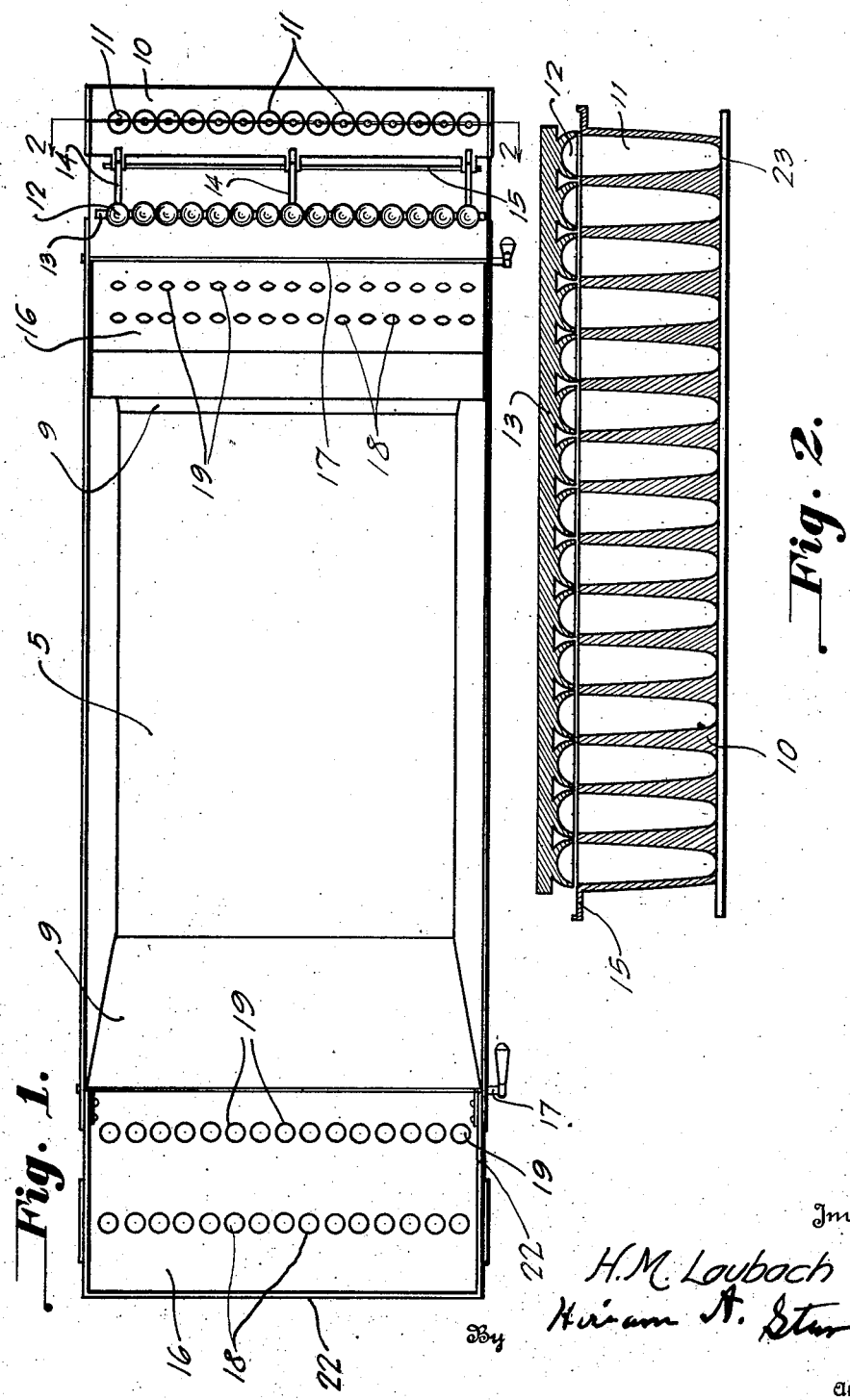

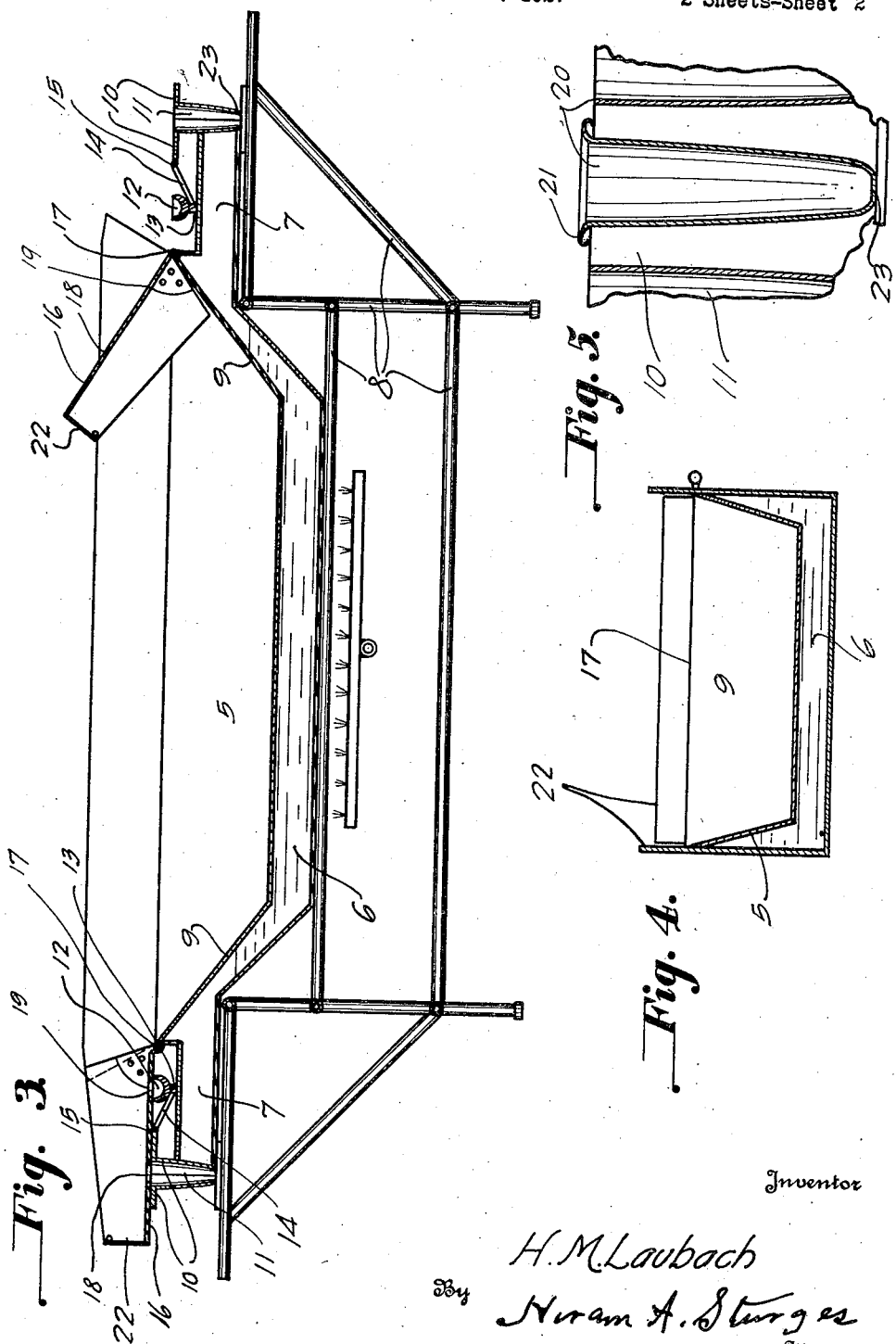

1,664,120

UNITED STATES PATENT OFFICE.

HOWARD M. LAUBACH, OF OMAHA, NEBRASKA.

EAR-FORMING APPARATUS FOR POP CORN.

Application filed July 5, 1927. Serial No. 203,465.

This invention relates to an apparatus for use in forming edible elongated bodies of popcorn having a shape similar to ears of corn.

One of the objects of the invention is to provide an apparatus by use of which a large number of popcorn-ears may be formed at a single operation.

Another object is to provide such a construction that these elongated edible bodies may be conveniently produced.

Still another object is to provide an apparatus of such arrangement that each elongated body or ear of popped corn will be covered with a flexible jacket so that the hands or fingers of the user will be protected from the syrup or other adhesive part of the ear.

The invention includes such a construction that the ears of popped corn may be produced by mechanical means, it not being necessary that the hands of the operator should come into contact with the product, this being a sanitary feature.

With the foregoing objects in view and others to be mentioned the invention presents a novel and useful construction, combination and arrangement of parts as described herein and claimed, and as illustrated in the accompanying drawings, it being understood that changes may be made in form, size, proportion of parts and minor details, said changes being determined by the scope of the invention as claimed.

In the drawings Fig. 1 is a plan view of the apparatus, one of the operating-plates being elevated. Fig. 2 is a view of the same in longitudinal section. Fig. 3 is a side view, partly in section, of a molding block. Fig. 4 is a transverse section through the tank showing steam chambers. Fig. 5 is an enlarged detail showing one of the molds and a flexible jacket therein.

Referring now to the drawing for a more particular description, numeral 5 indicates a tank adapted to contain a large quantity of the popped corn and in which it is mixed with syrup, a rake preferably being used for this purpose.

Numeral 6 indicates a compartment in or beneath the bottom for containing water to be heated by a burner or other suitable means.

The tank is provided at its sides with steam compartments and with a pair of steam compartments 7 which project beyond the ends.

Numeral 8 indicates a frame upon which the tank is supported and at 9 are indicated a pair of inclined slideways upon which the mixed popcorn may be moved upwardly and outwardly from the tank, a fine-toothed rake preferably being used for this purpose.

Numerals 10 indicate separable molding blocks to provide molds 11 in which the elongated edible bodies of popcorn, each of ear-form, are formed, said molding blocks preferably being supported by the frame.

Numerals 12 indicate a plurality of secondary molds, these being cup-shape and mounted on a bar 13, and by means of arms 14 the molds 12 may be swung in an arc of a half-circle to cause coincident registration thereof with the molds 11.

It will be seen that the molds 11 may be disposed closely adjacent to the ends of the steam chamber 7 and that the cup-shaped molds when in their normal position are disposed in near proximity to said steam compartments, the advantage of this construction being that they will be maintained in a heated condition.

The molds 12 swing from a horizontal rod 15, said rod having bearings at its ends in the sides of the apparatus, and when these rods are rotated in one direction the molds 12 will move a half-circle and will register with the molds 11, and when the rods 15 are rotated a half-circle in an opposite direction the molds 12 will be moved to a horizontal position between the molds 11 and the upper end of a slideway 9, the bars 13 at that time being supported by the steam chambers 7 of the tank.

I provide a pair of operating-plates 16, preferably of rectangular form, each being pivotally connected at one of its edges with the upper end of a slideway 9, a rod 17 preferably being used for this connection, and when this plate has been swung downwardly to a horizontal position the mixed popcorn, or a part thereof may be moved upwardly from the tank to the operating-plate by use of the fine-toothed rake mentioned.

Numerals 18 indicate apertures which are provided for this operating-plate and adjacent to the row of apertures 18 are apertures 19, and it will be understood that when the operating-plate has been swung to a horizontal position the apertures 18 and 19 will register, respectively, with the molds 11 and 12.

Numerals 20 indicate flexible jackets having the same form approximately, as the form of the molds 11, each jacket, preferably being provided with an annular flange 21, and these jackets may be disposed in the molds 11, their flanges resting upon the upper ends of said molds.

Numerals 22 indicate guard-rails or detent plates carried by the operating-plates, these being secured to the sides and outer ends of the operating-plates to prevent loss or waste of the popcorn during operation.

As described, it will be seen that the ears of popped corn may be conveniently formed, and that the work may proceed rapidly. The syrup is used at a temperature of 260 degrees F. and the operation of mixing, in the tank, causes each kernel of popped corn to receive a coat of syrup.

Since the popcorn is subjected to heat the syrup will not become hardened and may be molded to advantage.

In operation, the popcorn is moved on the plates 16 to the molds by moving through apertures 18 and 19. The operating-plate 16 is then swung upwardly and by rotating the rod 17 the cup-shaped molds 12 will be disposed in register with the molds 11.

The result in the use of the molds 12 is the production of cap-shaped heads for the ears, and in operation the flat adhesive surfaces of these caps, will engage the flat ends of the ears in the molds 11 by operation of the swinging movement described, and the caps will be added to the end of the ears to provide an attractive appearance to the product. The end of each ear opposite to its head or cap will be of tapered form since, as plainly shown in the drawing, the molds 11 are of convergent form at or near one of their ends. Numerals 23 indicate vent apertures for said molds 11.

After the complete ears have been formed in molds 11, said molds are separated and the ears may be removed. The operating-plates 16 may then be swung to a horizontal position and the operation repeated.

The use of the jackets mentioned prevents the syrup from adhering to the molds 11, and the jackets, preferably constructed of paper, maintain the ears in a sanitary condition.

While I have shown and described a mixing tank provided with molding devices at each end, this being preferred in some instances, I do not wish to limit myself in this respect. Also while I prefer to use the molds 12, and flexible jackets 20 I may dispense with their use in some instances. However, the jackets are of great advantage as they prevent deposits of adhesive syrup on the molds and after the ears have been formed they prevent accumulation of dust.

I claim as my invention,—

1. In an ear-forming apparatus for popcorn, a mixing tank having an inclined slideway for an upward and outward movement thereon of popcorn from the tank, a plurality of molds adjacent to the tank, an apertured operating-plate, and detent-plates mounted on the operating-plate, said operating-plate being adapted to be disposed with its apertures in register with said molds and having a part extending to said slideway for receiving the popcorn and to provide a support for a movement thereon of the popcorn to said molds.

2. In an ear-forming apparatus for popcorn, a mixing-tank having an inclined slideway to permit a movement upwardly and outwardly of the popcorn from said tank, an apertured rectangular operating-plate pivotally connected with the slideway adapted to have a swinging movement to a horizontal position to dispose its apertures in register with said molds and to provide a support for receiving the popcorn thereon from the slideway and for a movement thereon of the popcorn to the molds, and detent-plates mounted on two sides and an end of said operating-plate for controlling the movements of said popcorn.

3. In an ear-forming apparatus for popcorn, a mixing-tank, molds adjacent to said tank, pivotally mounted cup-shaped molds adjacent to the first named molds, a pivotally mounted, apertured, rectangular operating-plate adapted to be disposed horizontally with its apertures in register with the first named molds and with the cup-shaped molds for receiving popcorn from the tank and to provide a support for moving said popcorn thereon to said molds, said operating-plate being adapted to be swung upwardly to permit the cup-shaped molds to be swung for conducting the popcorn therein to said first named molds, and detent-plates mounted on the operating-plate for controlling the movements of said popcorn.

4. In an ear-forming apparatus for popcorn, a mixing-tank provided at its ends with inclined slideways, a plurality of molds adjacent to the respective ends of the tank, a pair of apertured operating-plates each being pivotally connected with a slideway and adapted to have a swinging movement to dispose its apertures in register with the molds at an end of the tank, said operating-plates providing supports for receiving the popcorn thereon from the slideways and for moving said popcorn to said molds.

5. In an ear-forming apparatus for popcorn, a mixing-tank having steam chambers at its sides and bottom and inclined slides at its ends extending from its bottom to its top, a plurality of molds at the respective ends of the tank, and a pair of apertured operating-plates pivotally connected with the slides of the tank, said plates being movable to dispose their apertures in register with said molds and providing a support for receiving popcorn from the tank to be delivered to said molds.

6. In an ear-forming apparatus for popcorn, a frame, a mixing-tank on the frame provided with steam chambers and inclined slides at its ends for moving the popcorn thereon, molds on the frame at the respective ends of the tank and a pair of apertured operating-plates adapted to be disposed with their apertures in register with said molds and to extend to and engage the slides of said tank for receiving the popcorn therefrom for delivery to said molds.

7. In an ear-forming apparatus for popcorn, a mixing-tank having inclined slideways at its ends for a movement thereon of popcorn upwardly and outwardly from the tank, a frame for supporting the tank, molds upon the frame at the ends of the tank, pivotally mounted secondary molds normally disposed between the first named molds and each slideway, a pair of apertured operating-plates each being pivotally connected with a slideway and adapted to be swung to a horizontal position for receiving the popcorn from a slideway and to dispose its apertures in register with the first named molds and secondary molds, said operating-plates being adapted to be swung upwardly to permit the secondary molds to be moved into register with the first named molds, said tank being provided with a pair of steam heating chambers projecting beyond its ends to lie beneath the secondary molds.

8. In an ear-forming apparatus for popcorn, a frame, a plurality of upright, separable molds on the frame each being open at its top and formed convergent toward its lower end, a mixing-tank on the frame having a steam compartment adjacent to said molds and provided with an inclined slideway from its bottom to its top, and an apertured operating-plate pivotally connected with the slideway and movable to dispose its apertures in register with said molds.

In testimony whereof, I have affixed my signature.

HOWARD M. LAUBACH.